United States Patent
Lee et al.

(10) Patent No.: US 10,219,317 B2
(45) Date of Patent: Feb. 26, 2019

(54) METHOD FOR HANDLING OF DATA TRANSMISSION AND RECEPTION FOR SENB RELATED BEARER RELEASE AT A USER EQUIPMENT IN A DUAL CONNECTIVITY SYSTEM AND DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 15/312,362

(22) PCT Filed: Jul. 6, 2015

(86) PCT No.: PCT/KR2015/006946
§ 371 (c)(1),
(2) Date: Nov. 18, 2016

(87) PCT Pub. No.: WO2016/047904
PCT Pub. Date: Mar. 31, 2016

(65) Prior Publication Data
US 2017/0086254 A1   Mar. 23, 2017

Related U.S. Application Data

(60) Provisional application No. 62/055,634, filed on Sep. 25, 2014.

(51) Int. Cl.
*H04W 72/14* (2009.01)
*H04W 76/34* (2018.01)
(Continued)

(52) U.S. Cl.
CPC .......... *H04W 76/34* (2018.02); *H04L 5/0098* (2013.01); *H04W 72/042* (2013.01); *H04W 72/0413* (2013.01); *H04W 72/14* (2013.01)

(58) Field of Classification Search
CPC . H04W 76/34; H04W 72/14; H04W 72/0413; H04W 72/042; H04W 76/064; H04L 5/0098
See application file for complete search history.

(56) References Cited

U.S. PATENT DOCUMENTS

2016/0255675 A1* 9/2016 Van Lieshout ....... H04L 1/1829
370/329
2016/0373975 A1* 12/2016 Xu .................... H04W 36/0055
(Continued)

OTHER PUBLICATIONS

LG Electronics Inc: "PDCP reordering after Split Bearer release", R2-143727, 3GPP TSG-RAN WG2 Meeting #87, Dresden, Germany, Aug. 18-22, 2014, pp. 2-3.
(Continued)

*Primary Examiner* — Walli Z Butt
(74) *Attorney, Agent, or Firm* — Dentons US LLP

(57) ABSTRACT

The present invention relates to a wireless communication system. More specifically, the present invention relates to a method and a device for handling of data transmission and reception for SeNB related bearer release in a dual connectivity system, the method comprising: receiving, from a Master eNB (MeNB), a 1st message for requesting to release a SCG (Secondary Cell Group) bearer or a SCG part of a split bearer configured in the SeNB; releasing downlink part of the SCG bearer or the SCG part of the split bearer configured in the SeNB; receiving, from the MeNB, a 2nd message for indicating that a UE has released the SCG bearer or the SCG part of the split bearer configured in the SeNB; and releasing uplink part of the SCG bearer or the SCG part of the split bearer configured in the SeNB.

10 Claims, 19 Drawing Sheets

(51) Int. Cl.
*H04L 5/00* (2006.01)
*H04W 72/04* (2009.01)

(56) References Cited

U.S. PATENT DOCUMENTS

2017/0013650 A1* 1/2017 Fujishiro .............. H04W 88/06
2017/0149546 A1* 5/2017 Zhang .................. H04W 24/00
2017/0289871 A1* 10/2017 Hapsari ................ H04W 36/02

OTHER PUBLICATIONS

Pantech: "SCG release procedure on dual connectivity", R1-140253, 3GPP TSG-RAN WG2 Meeting #85, Prague, Czech Republic, Feb. 10-14, 2014, pp. 1-2.
NTT Docomo Inc: "SCG resource release and forwarding during SeNB change", R1-141631, 3GPP TSG-RAN WG2 #85bis, Valencia, Spain, Mar. 31-Apr. 4, 2014, p. 3.
Alcatel-Lucent: "SCG reconfiguration handling during SCG change/release", R2-143629, 3GPP TSG-RAN WG2 #87, Dresden, Germany, Aug. 18-22, 2014, p. 2.
NEC: "SCG release procedure", R2-141561, 3GPP TSG RAN2 Meeting #85bis, Valencia, Spain, Mar. 31-Apr. 4, 2014, pp. 1-3.

* cited by examiner (a) Control-Plane Protocol Stack (b) User-Plane Protocol Stack (a) C-Plane connectivity of eNBs involved in dual connectivity (b) U-Plane connectivity of eNBs involved in dual connectivity

METHOD FOR HANDLING OF DATA TRANSMISSION AND RECEPTION FOR SENB RELATED BEARER RELEASE AT A USER EQUIPMENT IN A DUAL CONNECTIVITY SYSTEM AND DEVICE THEREFOR

This application is a 35 USC § 371 National Stage entry of International Application No. PCT/KR2015/006946 filed on Jul. 6, 2015, and claims priority to U.S. Provisional Application No. 62/055,634 filed on Sep. 25, 2014, all of which are hereby incorporated by reference in their entireties as if fully set forth herein.

TECHNICAL FIELD

The present invention relates to a wireless communication system and, more particularly, to a method for handling of data transmission and reception for SeNB related bearer release in a dual connectivity system at a UE in a dual connectivity system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for handling of data transmission and reception for SeNB related bearer release in a dual connectivity system. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: receiving, from a Master eNB (MeNB), a 1st message for requesting to release a SCG (Secondary Cell Group) bearer or a SCG part of a split bearer configured in the SeNB; releasing downlink part of the SCG bearer or the SCG part of the split bearer configured in the SeNB; receiving, from the MeNB, a 2nd message for indicating that a UE has released the SCG bearer or the SCG part of the split bearer configured in the SeNB; and releasing uplink part of the SCG bearer or the SCG part of the split bearer configured in the SeNB.

The object of the present invention can be achieved by providing a method for a User Equipment (UE) operating in a wireless communication system, the method comprising: transmitting, to a Master eNB (MeNB), a 1st message for indicating that the SeNB has released or will release a SCG (Secondary Cell Group) bearer or a SCG part of a split bearer configured in the SeNB; releasing downlink part of the SCG bearer or the SCG part of the split bearer configured in the SeNB; receiving, from a MeNB, a 2nd message for indicating that a UE has released the SCG bearer or the SCG part of the split bearer configured in the SeNB; and releasing uplink part of the SCG bearer or the SCG part of the split bearer configured in the SeNB.

The object of the present invention can be achieved by providing a method for a User Equipment (UE) operating in a wireless communication system, the method comprising: releasing transmitting part of one or more radio bearers in the wireless transmitting-receiving device; receiving a message indicating that a peer wireless transmitting-receiving device has released transmitting part of the one or more radio bearers in the peer wireless transmitting-receiving device; and releasing receiving part of the one or more radio bearers in the wireless transmitting-receiving device.

Preferably, the releasing the downlink part of the SCG bearer or the SCG part of the split bearer configured in the SeNB includes at least one of: stopping, by the SeNB, a downlink transmission via the SCG bearer or the SCG part of the split bearer of which downlink part is released; stopping, by the SeNB, a downlink assignment via the SCG bearer or the SCG part of the split bearer of which downlink part is released; discarding, by the SeNB, the RLC (Radio Link Control) PDUs (Protocol Data Units) or MAC (Medium Access Control) PDUs to be transmitted for the SCG bearer or the SCG part of the split bearer of which downlink part is released; or releasing, by the SeNB, a transmitting side of at least one of MAC entity, RLC entity and PDCP (Packet Data Convergence Protocol) entity via the SCG bearer or the SCG part of the split bearer of which downlink part is released.

Preferably, the releasing the uplink part of the SCG bearer or the SCG part of the split bearer configured in the SeNB includes at least one of: stopping, by the SeNB, an uplink reception via the SCG bearer or the SCG part of the split bearer of which uplink part is released; stopping, by the SeNB, an allocating uplink grant via the SCG bearer or the SCG part of the split bearer of which uplink part is released; discarding the RLC (Radio Link Control) PDUs (Protocol Data Units) or MAC (Medium Access Control) PDUs received for the SCG bearer or the SCG part of the split bearer of which uplink part is released; or releasing, by the SeNB, the receiving side of at least one of MAC entity, RLC entity and PDCP (Packet Data Convergence Protocol) entity via the SCG bearer or the SCG part of the split bearer of which uplink part is released.

Preferably, the 1st message and the 2nd message include an identifier of the SCG bearer or an identifier of the split bearer.

Preferably, if the 1st message includes the identifier of the SCG bearer or the identifier of the split bearer, the SeNB releases downlink part of the indicated SCG bearer or the SCG part of the split bearer configured in the SeNB.

Preferably, if the 2nd message includes the identifier of the SCG bearer or the identifier of the split bearer, the SeNB releases uplink part of the indicated SCG bearer or the SCG part of the split bearer configured in the SeNB.

Preferably, if the 1st message doesn't include the identifier of the SCG bearer or the identifier of the split bearer, the SeNB releases downlink part of all SCG bearers or the SCG part of the split bearers configured in the SeNB.

Preferably, if the 2nd message doesn't include the identifier of the SCG bearer or the identifier of the split bearer, the SeNB releases uplink part of all SCG bearers or the SCG part of the split bearers configured in the SeNB.

It is to be understood that both the foregoing general description and the following detailed description of the present invention are exemplary and explanatory and are intended to provide further explanation of the invention as claimed.

Advantageous Effects

According to the present invention, handling of data transmission and reception for SeNB related bearer release in a dual connectivity system. It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
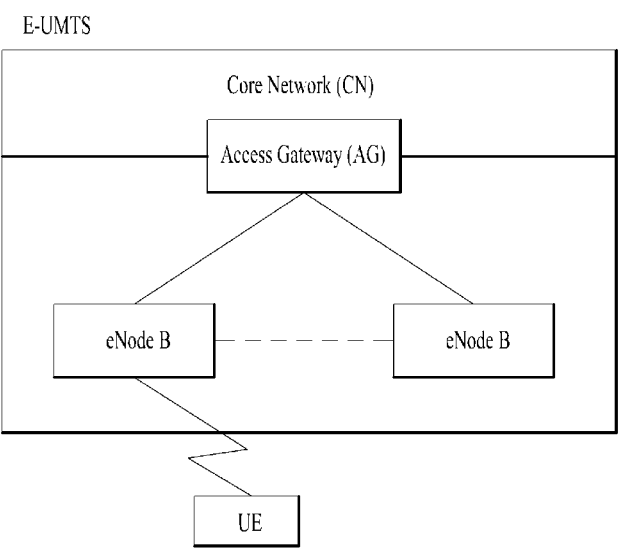
FIG. 1 is a diagram showing a network structure of an Evolved Universal Mobile Telecommunications System (E-UMTS) as an example of a wireless communication system.
Figure 2A:
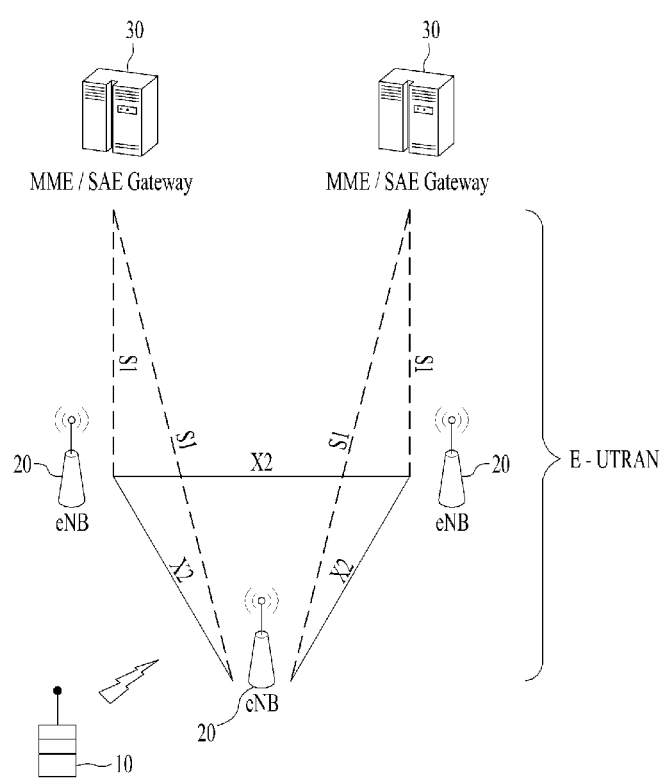
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
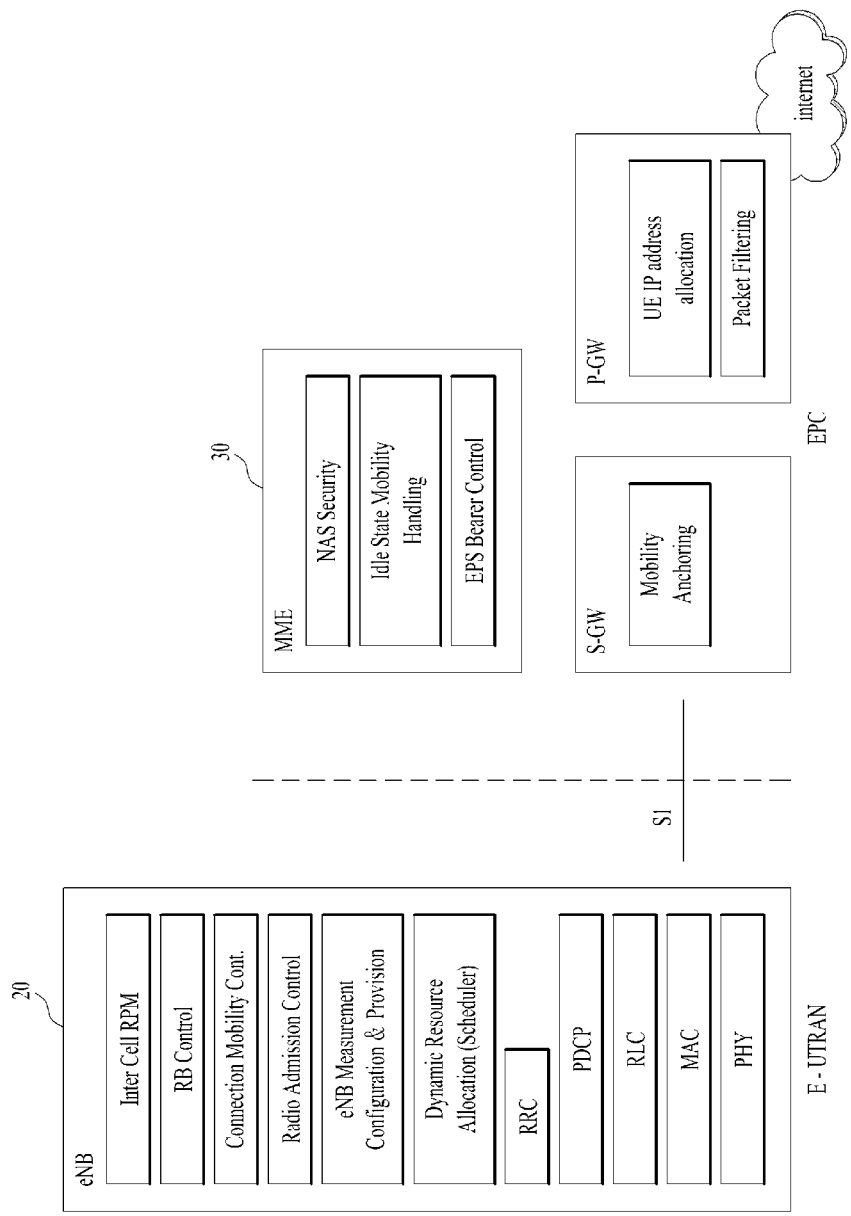
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
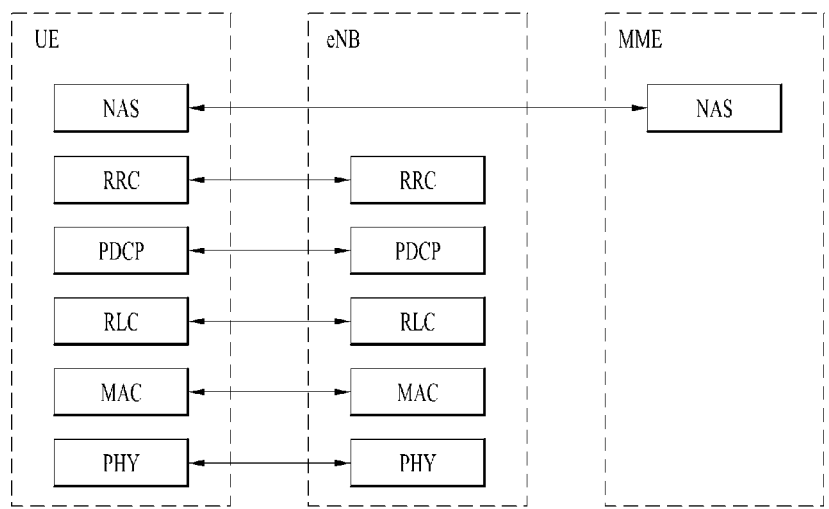
FIG. 3 is a diagram showing a control plane and a user plane of a radio interface protocol between a UE and an E-UTRAN based on a 3rd generation partnership project (3GPP) radio access network standard.
Figure 3:
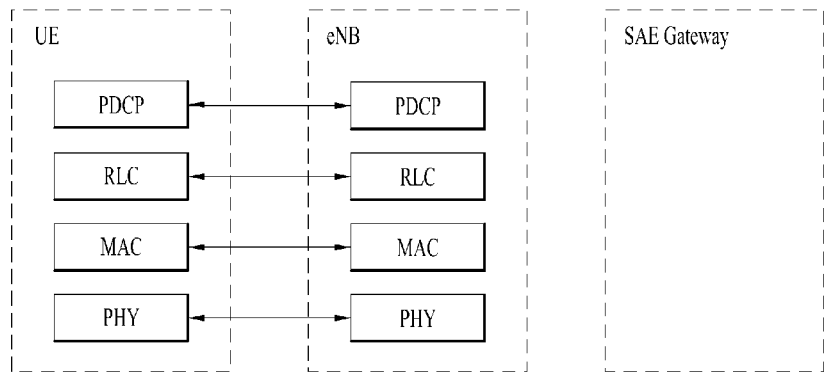

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
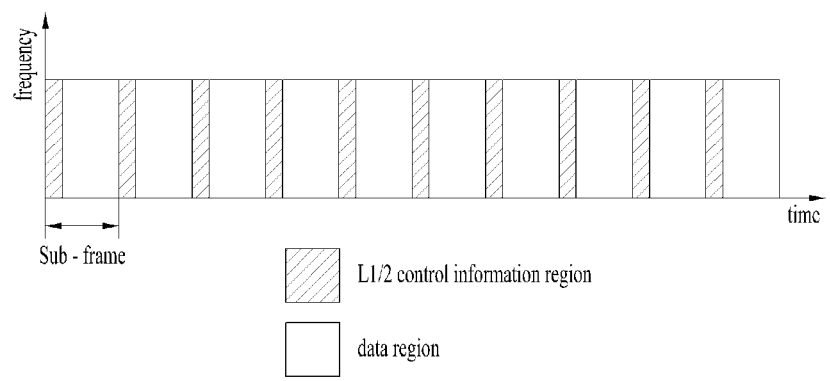
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
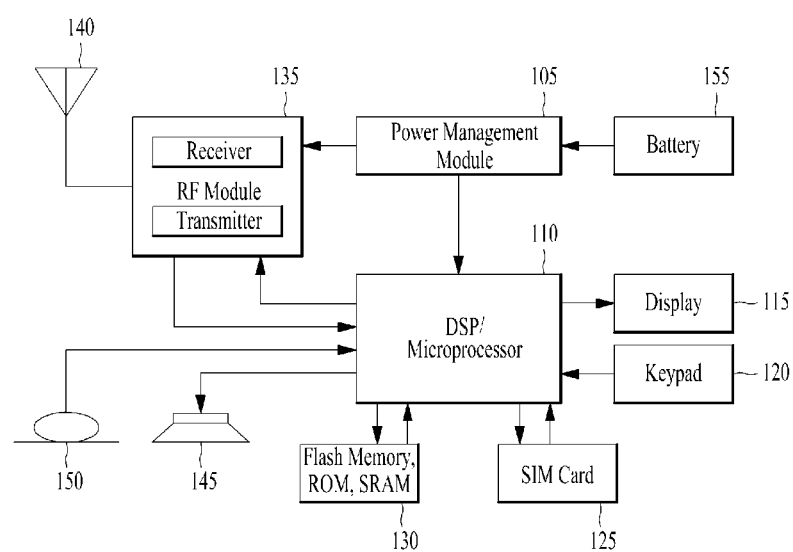
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
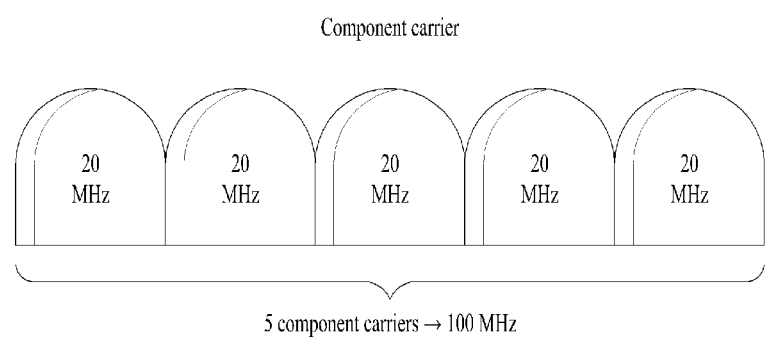
FIG. 6 is a diagram for carrier aggregation.

FIG. 6 is a diagram for carrier aggregation.

Carrier aggregation technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 7:
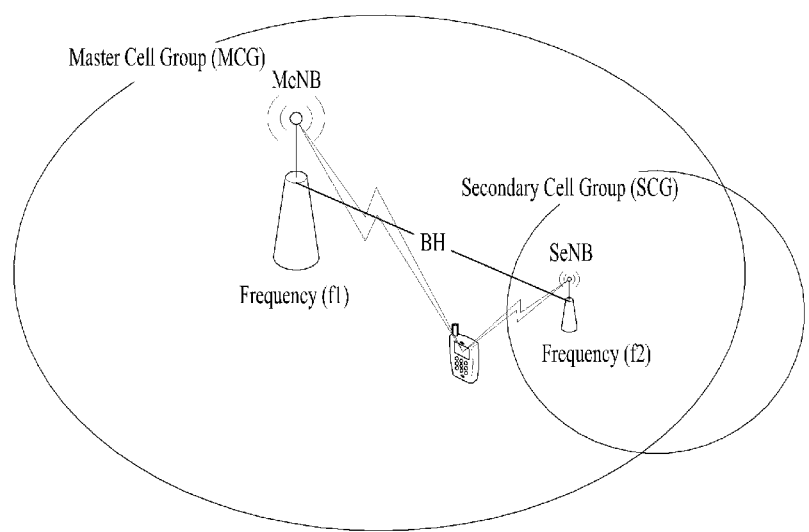
FIG. 7 is a conceptual diagram for dual connectivity between a Master Cell Group (MCS) and a Secondary Cell Group (SCG)

FIG. 7 is a conceptual diagram for dual connectivity (DC) between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

Figure 10:
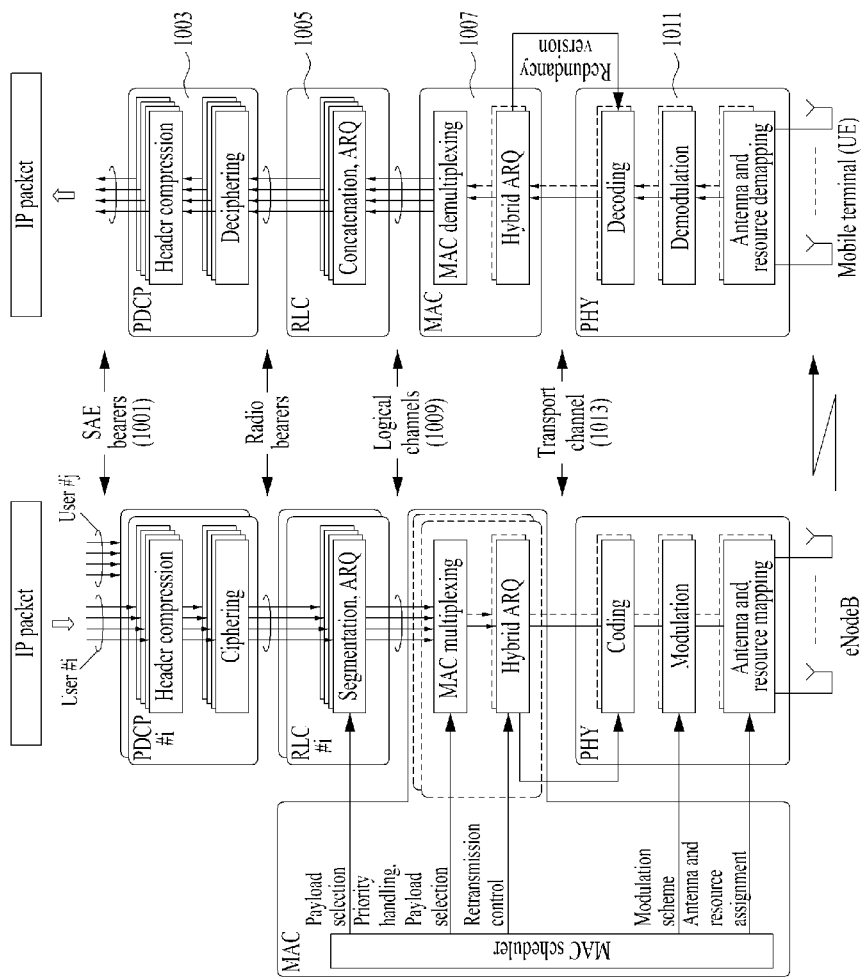
FIG. 10 is a diagram for a general overview of the LTE protocol architecture for the downlink.

The dual connectivity is a kind of carrier aggregation in that the UE is configured a plurality serving cells. However, unlike all serving cells supporting carrier aggregation of FIG. 8 are served by a same eNB, all serving cells supporting dual connectivity of FIG. 10 are served by different eNBs, respectively at same time. The different eNBs are connected via non-ideal backhaul interface because the UE is connected with the different eNBs at same time.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 8A:
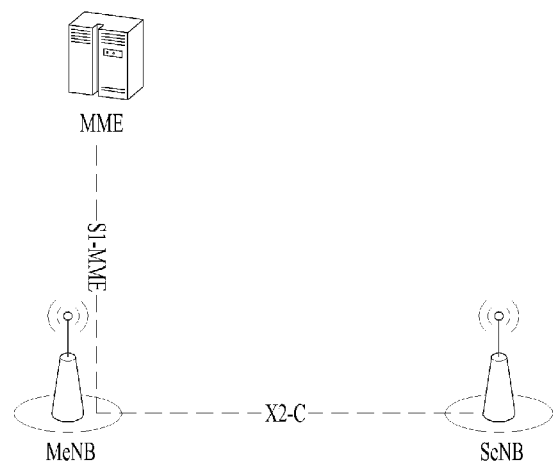
FIG. 8a is a conceptual diagram for C-Plane connectivity of base stations involved in dual connectivity.

FIG. 8a shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As FIG. 8a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 8B:
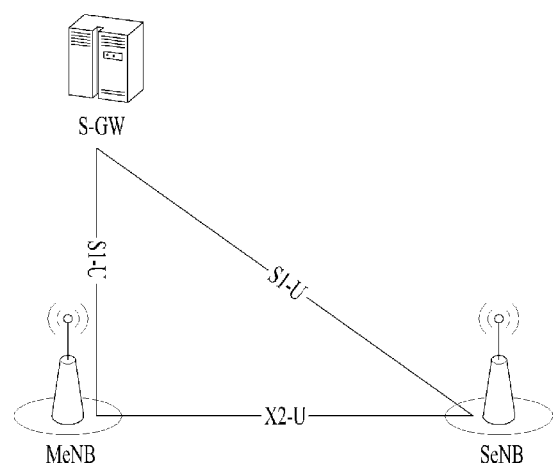
FIG. 8b is a conceptual diagram for U-Plane connectivity of base stations involved in dual connectivity.

FIG. 8b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 9:
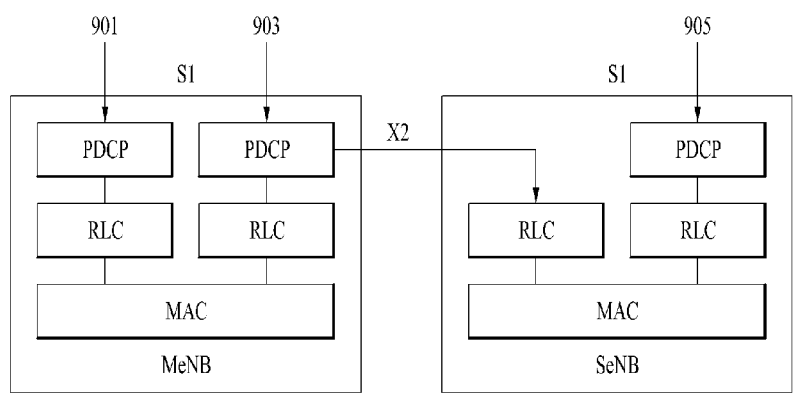
FIG. 9 is a conceptual diagram for radio protocol architecture for dual connectivity.

FIG. 9 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (901), split bearer (903) and SCG bearer (905). Those three alternatives are depicted on FIG. 9. The SRBs (Signaling Radio Bearers) are always of the MCG bearer and therefore only use the radio resources provided by the MeNB. The MCG bearer (901) is a radio protocol only located in the MeNB to use MeNB resources only in the dual connectivity. And the SCG bearer (905) is a radio protocol only located in the SeNB to use SeNB resources in the dual connectivity.

Specially, the split bearer (903) is a radio protocol located in both the MeNB and the SeNB to use both MeNB and SeNB resources in the dual connectivity and the split bearer (903) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer (903) are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

The expected drawbacks of the split bearer (903) are: i) need to route, process and buffer all dual connectivity traffic in the MeNB, ii) a PDCP entity to become responsible for routing PDCP PDUs towards eNBs for transmission and reordering them for reception, iii) flow control required between the MeNB and the SeNB, iv) in the uplink, logical channel prioritization impacts for handling RLC retransmissions and RLC Status PDUs (restricted to the eNB where the corresponding RLC entity resides) and v) no support of local break-out and content caching at SeNB for dual connectivity UEs.

In Dual Connectivity, two MAC entities are configured in the UE: one for the MCG and one for the SCG. Each MAC entity is configured by RRC with a serving cell supporting PUCCH transmission and contention based Random Access. The term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

The functions of the different MAC entities in the UE operate independently if not otherwise indicated. The timers and paramenters used in each MAC entity are configured independently if not otherwise indicated. The Serving Cells, C-RNTI, radio bearers, logical channels, upper and lower layer entities, LCGs, and HARQ entities considered by each MAC entity refer to those mapped to that MAC entity if not otherwise indicated On the other hand, in the dual connectivity, one PDCP entity is configured in the UE. For one UE, there are two different eNBs that are connected via non-ideal backhaul X2. In case the split bearer (903) is transmitted to different eNBs (MeNB and SeNB), the SeNB forwards the PDCP PDU to the MeNB. Due to the delay over non-ideal backhaul, the PDCP PDUs are likely to be received out-of-sequence.

FIG. 10 is a diagram for a general overview of the LTE protocol architecture for the downlink.

A general overview of the LTE protocol architecture for the downlink is illustrated in FIG. 10. Furthermore, the LTE protocol structure related to uplink transmissions is similar to the downlink structure in FIG. 10, although there are differences with respect to transport format selection and multi-antenna transmission.

Data to be transmitted in the downlink enters in the form of IP packets on one of the SAE bearers (1001). Prior to transmission over the radio interface, incoming IP packets are passed through multiple protocol entities, summarized below and described in more detail in the following sections:

*Packet Data Convergence Protocol (PDCP, 1003) performs IP header compression to reduce the number of bits necessary to transmit over the radio interface. The header-compression mechanism is based on ROHC, a standardized header-compression algorithm used in WCDMA as well as several other mobile-communication standards. PDCP (1003) is also responsible for ciphering and integrity protection of the transmitted data. At the receiver side, the PDCP protocol performs the corresponding deciphering and decompression operations. There is one PDCP entity per radio bearer configured for a mobile terminal.

*Radio Link Control (RLC, 1005) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1005) offers services to the PDCP (1003) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

*Medium Access Control (MAC, 1007) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1007) offers services to the RLC (1005) in the form of logical channels (1009).

*Physical Layer (PHY, 1011), handles coding/decoding, modulation/demodulation, multi-antenna mapping, and other typical physical layer functions. The physical layer (1011) offers services to the MAC layer (1007) in the form of transport channels (1013).

Meanwhile, when a MAC entity receives a MAC PDU for the UE's C-RNTI or Semi-Persistent Scheduling C-RNTI, or by the configured downlink assignment, containing reserved or invalid values, the MAC entity may discard the received PDU.

When a MAC entity receives a MAC PDU on MCH containing reserved values, the UE may ignore the fields in the PDU header and the control elements containing reserved values and the corresponding parts indicated by the fields in the received PDU.

Figure 11A:
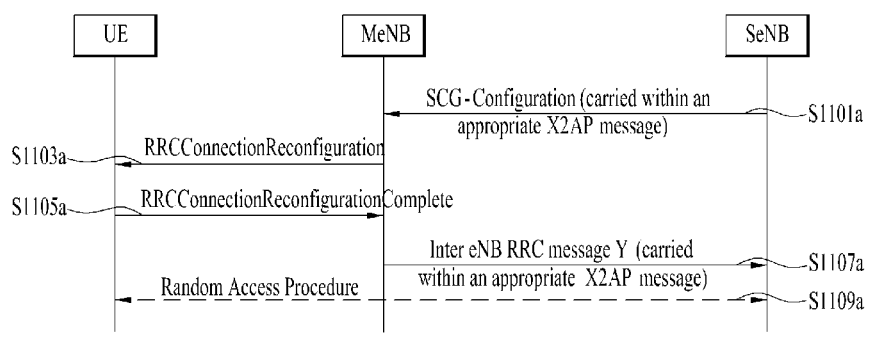
FIG. 11a is a diagram for SCG Modification procedure.
Figure 11B:
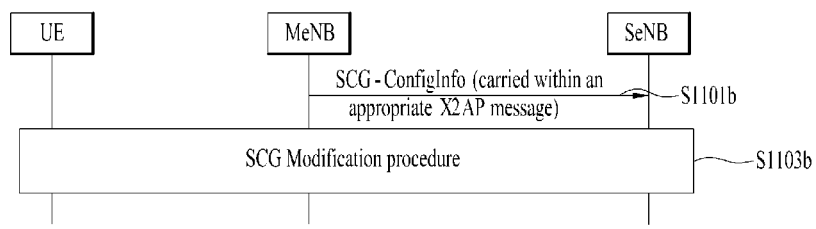
FIG. 11b is a diagram for SCG Addition/MeNB triggered SCG modification procedure.

FIG. 11*a* is a diagram for SCG Modification procedure, and FIG. 11*b* is a diagram for SCG Addition/MeNB triggered SCG modification procedure.

1. SCG Modification

The SCG modification procedure is initiated by the SeNB and used to perform configuration changes of the SCG within the same SeNB. FIG. 11*a* shows the SCG Modification procedure.

Regarding FIG. 11*a*, the SeNB requests SCG modification by providing the new radio resource configuration of SCG in the SCG-Configuration carried by an appropriate X2AP message (S1101*a*).

If MeNB accepts the SeNB request, the MeNB sends the RRCConnectionReconfiguration message to the UE including the new radio resource configuration of SCG according to the SCG-Configuration (S1103*a*).

The UE applies the new configuration and reply the RRCConnectionReconfigurationComplete message. If synchronisation towards the SeNB is not required for the new configuration, the UE may perform UL transmission after having applied the new configuration (S1105*a*). The MeNB replies the SCG Modification Response to the SeNB forwarding the Inter-eNB-RRC-message-Y message with an appropriate X2AP message (S1107*a*)

If the new configuration requires synchronisation towards the SeNB, the UE performs the Random Access procedure (S1109*a*).

In case the UE is unable to comply with (part of) the configuration included in the RRCConnectionReconfiguration message, it performs the reconfiguration failure procedure.

The order the UE sends the RRCConnectionReconfigurationComplete message and performs the Random Access procedure towards the SCG is not defined. The successful RA procedure towards the SCG is not required for a successful completion of the RRCConnectionReconfiguration procedure.

PSCell in SCG can be changed with the SCG Modification procedure. The SeNB can decide whether the Random Access procedure is required, e.g., depending on whether the old PSCell and new PSCell belongs to the same TAG.

The SeNB can use the SCG modification procedure to trigger release of SCG SCell(s) other than PSCell, and the MeNB cannot reject. However, the SeNB cannot use this procedure to trigger addition of an SCG SCell i.e. SCG SCell addition is always initiated by MeNB.

The SeNB can trigger the release of an SCG bearer or the SCG part of a split bearer, upon which the MeNB may release the bearer or reconfigure it to an MCG bearer. Details are FFS e.g. whether the SeNB may immediately trigger release or whether SeNB sends a trigger to the MeNB followed by a MeNB triggered SCG modification.

2. SCG Addition/MeNB Triggered SCG Modification.

The SCG addition procedure is initiated by the MeNB and used to add the first cell of the SCG. The MeNB triggered SCG modification procedure is initiated by the MeNB. In FIG. 11*b* shows the SCG Addition/MeNB triggered SCG modification procedure. The MeNB can use the procedure to initiate addition or release of SCG cells and of SCG bearer or split bearer on SCG. For all SCG modifications other than release of the entire SCG, the SeNB generates the signaling towards the UE. The MeNB can request to add particular cells to the SeNB, and the SeNB may reject. With the modification procedure, the MeNB can trigger the release of SCG SCell(s) other than PSCell, and in this case the SeNB cannot reject.

The MeNB sends within an appropriate X2AP message the SCG-ConfigInfo which contains the MCG configuration and the entire UE capabilities for UE capability coordination to be used as basis for the reconfiguration by the SeNB. In case of SCG addition and SCG SCell addition request, the MeNB can provide the latest measurement results for the SCG cell(s) requested to be added and SCG serving cell(s). The SeNB may reject the request (S1101*b*).

If the SeNB accepts the MeNB request, the SeNB initiates the SCG Modification procedure (S1103*b*)

3. SCG Change

The SCG change procedure is used to change configured SCG from one SeNB to another (or the same SeNB) in the UE. Towards target SeNB, the MeNB triggered SCG modification procedure. MeNB indicates in the RRCConnectionReconfiguration message towards the UE that the UE releases the old SCG configuration and adds the new SCG configuration. For the case of SCG change in the same SeNB, the path switch may be suppressed.

4. SCG Release

The SCG release procedure is used to release the CG in an SeNB. The SCG release procedure is realized by a specific X2 AP procedure not involving the transfer of an inter-eNB RRC message. The MeNB may request the SeNB to release the SCG, and vice versa. The recipient node of this request cannot reject. Consequently, the MeNB indicates in the RRCConnectionReconfiguration message towards the UE that the UE shall release the entire SCG configuration.

5. SCG Release During Handover Between MeNB and eNB

Upon handover involving change of MeNB, the source MeNB includes the SCG configuration in the HandoverPreparationInformation. The source MeNB initiates the release towards the SeNB and the target eNB prepares RRCConnectionReconfiguration message including mobilityControlInformation which triggers handover and generates/includes a field indicating the UE shall release the entire SCG configuration.

For intra-MeNB HO, the MeNB may indicate SCG change in RRCConnectionReconfiguration message including mobilityControlInformation. It is however assumed that upon inter-eNB handover, addition of an SCG can be initiated only after completing handover. The UE is not aware whether the handover is an intra- or inter-MeNB HO.

6. SeNB UE Information

The SeNB may provide information to MeNB regarding a particular UE and the MeNB may use this information to e.g. initiate release of SCG bearer or split bearer on SCG.

Figure 12A:
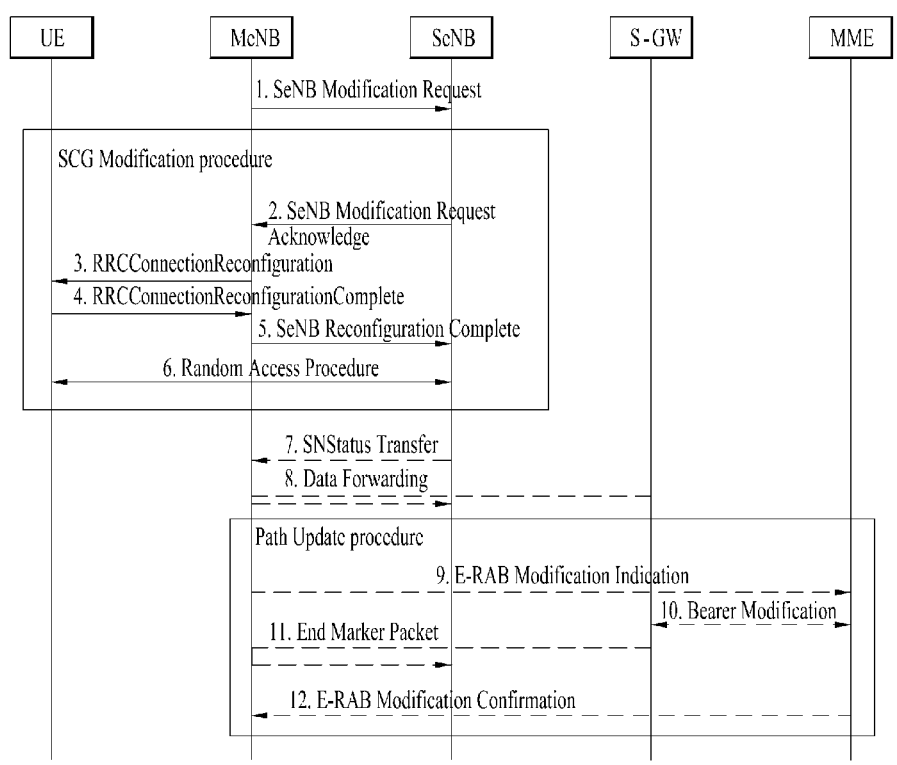
FIG. 12a is a diagram for SeNB Addition procedure.
Figure 12B:
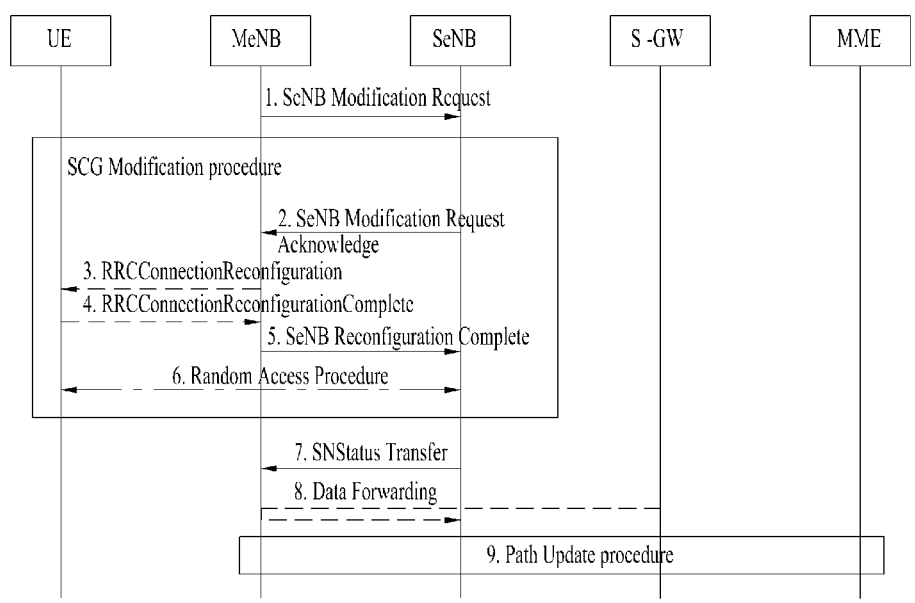
FIG. 12b is a diagram for SeNB Modification procedure-MeNB initiated.
Figure 12C:
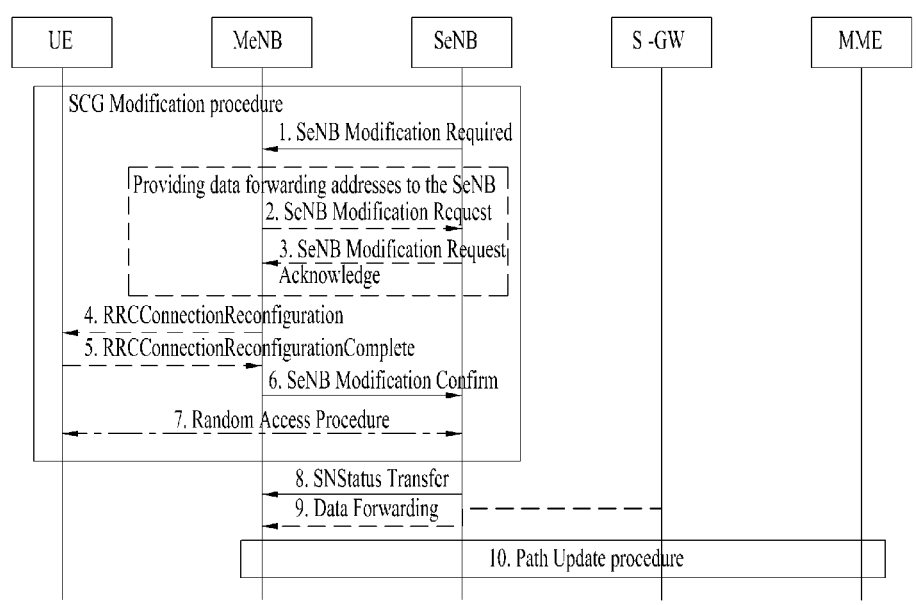
FIG. 12c is a diagram for SeNB Modification procedure-SeNB initiated.
Figure 12D:
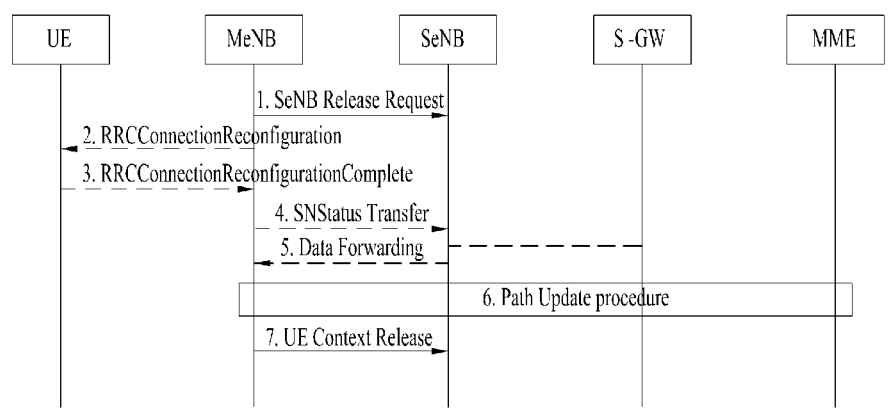
FIG. 12d is a diagram for SeNB Release procedure-MeNB initiated.
Figure 12E:
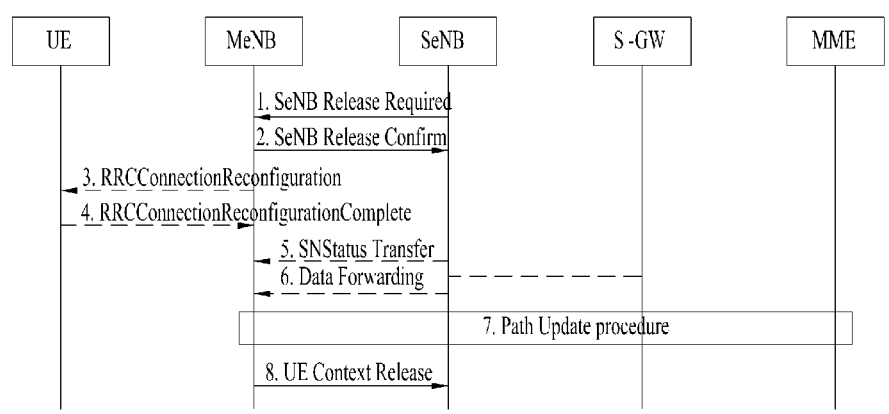
FIG. 12e is a diagram for SeNB Release procedure-SeNB initiated.
Figure 12F:
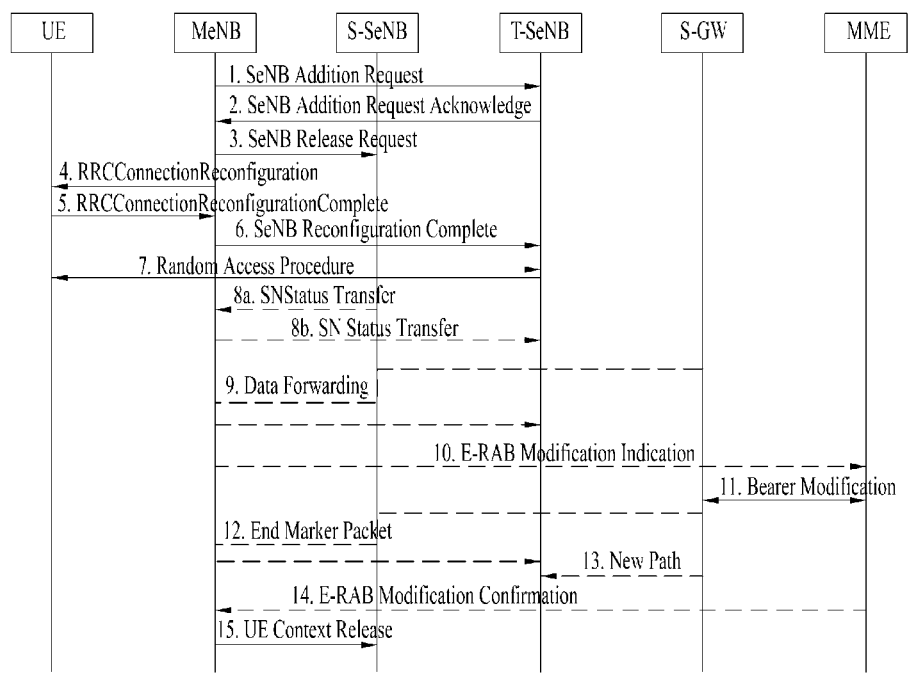
FIG. 12f is a diagram for SeNB Change procedure.
Figure 12G:
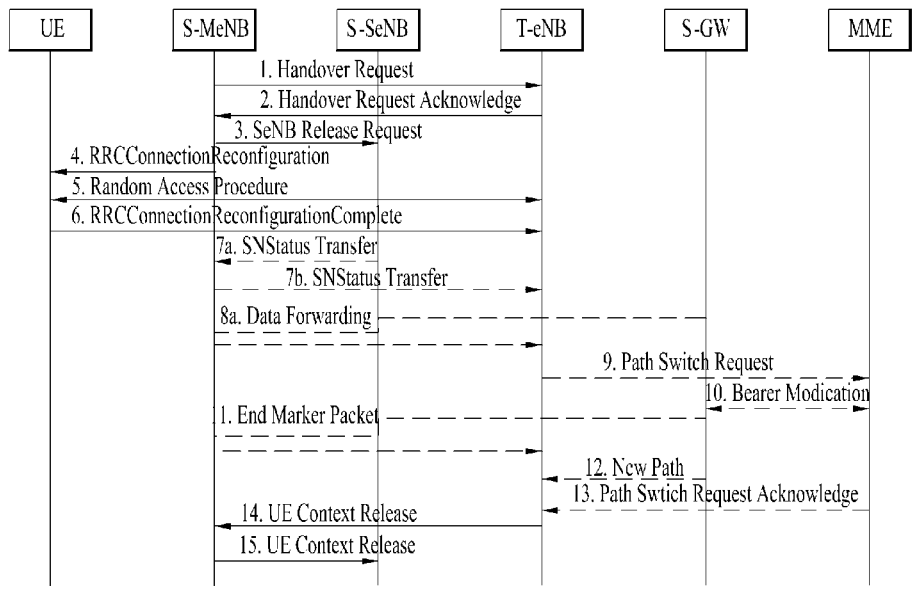
FIG. 12g is a diagram for MeNB to eNB Change procedure.

FIG. 12a is a diagram for SeNB Addition procedure, FIG. 12b is a diagram for SeNB Modification procedure-MeNB initiated, FIG. 112c is a diagram for SeNB Modification procedure-SeNB initiated, FIG. 12d is a diagram for SeNB Release procedure-MeNB initiated, FIG. 12e is a diagram for SeNB Release procedure-SeNB initiated, FIG. 12f is a diagram for SeNB Change procedure, and FIG. 12g is a diagram for MeNB to eNB Change procedure.

FIG. 12a is a diagram for SeNB Addition procedure. The SeNB Addition procedure is initiated by the MeNB and is used to establish a UE context at the SeNB in order to provide radio resources from the SeNB to the UE.

The MeNB decides to request the SeNB to allocate radio resources for a specific E-RAB, indicating E-RAB characteristics (1). In contrast to SCG bearer, for the split bearer option the MeNB may either decide to request resources from the SeNB of such an amount, that the QoS for the respective E-RAB is guaranteed by the exact sum of resources provided by the MeNB and the SeNB together, or even more. The MeNBs decision may be reflected in step 2 by the E-RAB parameters signaled to the SeNB, which may differ from E-RAB parameters received over S1.

If the RRM entity in the SeNB is able to admit the resource request, it allocates respective radio resources and, dependent on the bearer option, respective transport network resources (2). The SeNB may trigger Random Access so that synchronisation of the SeNB radio resource configuration can be performed. The SeNB provides the new radio resource configuration to the MeNB. For SCG bearers, together with Si DL TNL address information for the respective E-RAB, for split bearers X2 DL TNL address information.

If the MeNB endorses the new configuration, it triggers the UE to apply it. The UE starts to apply the new configuration (3). And the UE completes the reconfiguration procedure (4). The MeNB informs the SeNB that the UE has completed the reconfiguration procedure successfully (5). The UE performs synchronisation towards the cell of the SeNB (6).

In case SCG bearers, and dependent on the bearer characteristics of the respective E-RAB, the MeNB may take actions to minimise service interruption due to activation of dual connectivity (7~8). For SCG bearers, the update of the UP path towards the EPC is performed (9~10).

FIG. 12b is a diagram for SeNB Modification procedure-MeNB initiated and FIG. 15c is a diagram for SeNB Modification procedure-SeNB initiated.

The SeNB Modification procedure may be either initiated by the MeNB or by the SeNB. It may be used to modify, establish or release bearer contexts, to transfer bearer contexts to and from the SeNB or to modify other properties of the UE context at the SeNB. It does not necessarily need to involve signaling towards the UE.

Regarding FIG. 12b, the MeNB sends the SeNB Modification Request message, which may contain bearer context related or other UE context related information, and, if applicable data forwarding address information (1). The SeNB responds with the SeNB Modification Request Acknowledge message, which may contain radio configuration information, and, if applicable, data forwarding address information (2). The MeNB initiates the RRC connection reconfiguration procedure (3~4). Success of the RRC connection reconfiguration procedure is indicated in the SeNB Reconfiguration Complete message (5). The UE performs synchronisation towards the cell of the SeNB (6). If the bearer context at the SeNB is configured with the SCG bearer option and, if applicable. Data forwarding between MeNB and the SeNB takes place. (7~8). And if applicable, a path update is performed (9).

Regarding FIG. 12c, the SeNB sends the SeNB Modification Required message, which may contain bearer context related or other UE context related information (1).

If the bearer context at the SeNB is configured with the SCG bearer option and, if data forwarding needs to be applied, the MeNB triggers the preparation of the MeNB initiated SeNB Modification procedure and provides forwarding address information within the SeNB Modification Request message (2~3). The MeNB initiates the RRC connection reconfiguration procedure (4~5). Success of the RRC connection reconfiguration procedure is indicated in the SeNB Modification Confirm message (6). The UE performs synchronisation towards the cell of the SeNB (7). Data forwarding between MeNB and the SeNB takes place (8~9), and if applicable, a path update is performed (10).

FIG. 12d is a diagram for SeNB Release procedure-MeNB initiated, and FIG. 12e is a diagram for SeNB Release procedure-SeNB initiated.

The SeNB Release procedure may be either initiated by the MeNB or by the SeNB. It is used to release the UE context at the SeNB. It does not necessarily need to involve signaling towards the UE.

Regarding FIG. 12d, the MeNB initiates the procedure by sending the SeNB Release Request message (1). If a bearer context in the SeNB was configured with the SCG bearer option and is moved to e.g. the MeNB, the MeNB provides data forwarding addresses to the SeNB. The SeNB may start data forwarding and stop providing user data to the UE as early as it receives the SeNB Release Request message. The MeNB initiates the RRC connection reconfiguration procedure (2~3). Data forwarding from the SeNB to the MeNB takes place (4~5), and if applicable, the path update procedure is initiated (6). Upon reception of the UE CONTEXT RELEASE message, the SeNB can release radio and C-plane related resource associated to the UE context (7).

Regarding FIG. 12e, the SeNB initiates the procedure by sending the SeNB Release Required message which does not contain inter-node message (1). If a bearer context in the SeNB was configured with the SCG bearer option and is moved to e.g. the MeNB, the MeNB provides data forwarding addresses to the SeNB in the SeNB Release Confirm message (2). The SeNB may start data forwarding and stop providing user data to the UE as early as it receives the SeNB Release Confirm message. The MeNB initiates the RRC connection reconfiguration procedure (3~4). Data forwarding from the SeNB to the MeNB takes place (5~6) and if applicable, the path update procedure is initiated (7). Upon reception of the UE CONTEXT RELEASE message, the SeNB can release radio and C-plane related resource associated to the UE context. Any ongoing data forwarding may continue (8).

FIG. 12f is a diagram for SeNB Change procedure.

The SeNB Change procedure provides the means to transfer a UE context from a source SeNB to a target SeNB.

The MeNB initiates the SeNB Change procedure by requesting the target SeNB to allocate resources for the UE by means of the SeNB Addition Preparation procedure (1~2). If forwarding is needed, the target SeNB provides forwarding addresses to the MeNB.

If the allocation of target SeNB resources was successful, the MeNB initiates the release of the source SeNB resources towards the UE and Source SeNB (3). If data forwarding is needed the MeNB provides data forwarding addresses to the source SeNB. Either direct data forwarding or indirect data forwarding is used. Reception of the SeNB Release Request message triggers the source SeNB to stop providing user data to the UE and, if applicable, to start data forwarding. The MeNB triggers the UE to apply the new configuration (4~5). If the RRC connection reconfiguration procedure was successful, the MeNB informs the target SeNB (6). The UE synchronizes to the target SeNB (7). Data forwarding from the source SeNB takes place for E-RABs configured with the SCG bearer option. It may be initiated as early as the source SeNB receives the SeNB Release Request message from the MeNB (8~9). If one of the bearer contexts was configured with the SCG bearer option at the source SeNB, path update is triggered by the MeNB (10~14). Upon reception of the UE CONTEXT RELEASE message, the S-SeNB can release radio and C-plane related resource associated to the UE context. Any ongoing data forwarding may continue (15).

FIG. 12g is a diagram for MeNB to eNB Change procedure.

The source MeNB starts the MeNB to eNB Change procedure by initiating the X2 Handover Preparation procedure (1~2). The target eNB may provide forwarding addresses to the source MeNB. If the allocation of target eNB resources was successful, the MeNB initiates the release of the source SeNB resources towards the source SeNB (3). If the MeNB received forwarding addresses and a bearer context in the source SeNB was configured with the SCG bearer option and data forwarding is needed the MeNB provides data forwarding addresses to the source SeNB. Either direct data forwarding or indirect data forwarding is used. Reception of the SeNB Release Request message triggers the source SeNB to stop providing user data to the UE and, if applicable, to start data forwarding. The MeNB triggers the UE to apply the new configuration (4). The UE synchronizes to the target eNB (5~6). Data forwarding from the SeNB takes place for E-RABs configured with the SCG bearer option (7~8). It may start as early as the source SeNB receives the SeNB Release Request message from the MeNB. The target eNB initiates the S1 Path Switch procedure (9~13). The target eNB initiates the UE Context Release procedure towards the source MeNB (14). Upon reception of the UE CONTEXT RELEASE message, the S-SeNB can release radio and C-plane related resource associated to the UE context. Any ongoing data forwarding may continue (15).

Figure 13:
FIG. 13 is a diagram for transmitting RRCConnectionReconfiguration message from E-UTRAN and to UE.

FIG. 13 is a diagram for transmitting RRCConnectionReconfiguration message from E-UTRAN and to UE.

If the RRCConnectionReconfiguration message does not include the mobilityControlInfo and the UE is able to comply with the configuration included in this message, if this is the first RRCConnectionReconfiguration message after successful completion of the RRC Connection Re-establishment procedure, the UE may re-establish PDCP for SRB2 and for all DRBs that are established, if any, or re-establish RLC for SRB2 and for all DRBs that are established, if any, or perform the radio configuration procedure if the RRCConnectionReconfiguration message includes the fullConfig, or perform the radio resource configuration procedure if the RRCConnectionReconfiguration message includes the radioResourceConfigDedicated, or resume SRB2 and all DRBs that are suspended, if any.

If the RRCConnectionReconfiguration message includes the radioResourceConfigDedicated, the UE may perform the radio resource configuration procedure.

If the received RRCConnectionReconfiguration includes the sCellToReleaseList, the UE may perform SCell release. And if the received RRCConnectionReconfiguration includes the sCellToAddModList, the UE may perform SCell addition or modification. If the received RRCConnectionReconfiguration includes the systemInformationBlockType1Dedicated, the UE may perform the actions upon reception of the SystemInformationBlockType1 message. If the RRCConnectionReconfiguration message includes the dedicatedInfoNASList, the UE may forward each element of the dedicatedInfoNASList to upper layers in the same order as listed. If the RRCConnectionReconfiguration message includes the measConfig, the UE may perform the measurement configuration procedure. If the RRCConnectionReconfiguration message includes the otherConfig, the UE may perform the other configuration procedure.

The UE may submit the RRCConnectionReconfigurationComplete message to lower layers for transmission using the new configuration, upon which the procedure ends.

Meanwhile, if the RRCConnectionReconfiguration message includes the mobilityControlInfo and the UE is able to comply with the configuration included in this message, the UE may stop timer T310, if running, stop timer T312, if running, start timer T304 with the timer value set to t304, as included in the mobilityControlInfo, or the UE may consider the target PCell to be one on the frequency indicated by the carrierFreq with a physical cell identity indicated by the targetPhysCellId, if the carrierFreq is included.

Also, if the RRCConnectionReconfiguration message includes the mobilityControlInfo and the UE is able to comply with the configuration included in this message, the UE may the UE may start synchronising to the DL of the target PCell, reset MAC, re-establish PDCP for all RBs that are established, re-establish RLC for all RBs that are established, configure lower layers to consider the SCell(s), if configured, to be in deactivated state, apply the value of the newUE-Identity as the C-RNTI.

In dual connectivity, a SCG bearer and a split bearer is served by using the resource provided by SeNB. For bearer management, RAN2 defines several procedures and corresponding messages. For example, in order to release the SCG SCells, SCG bearer or SCG part of Split bearer,

- The MeNB initiated SeNB modification procedure can be used to initiate release of SCG SCells (other than PSCell), SCG bearer and SCG part of Split bearer.
- The SeNB initiated MeNB modification procedure can be used to perform configuration changes of the SCG within the same SeNB, e.g., to trigger release of SCG SCells (other than PSCell), SCG bearer and the SCG part of split bearer (upon which the MeNB may release the bearer or reconfigure it to an MCG bearer).
- The SeNB Release procedure may be either initiated by the MeNB or by the SeNB and is used to initiate the release of the UE context at the SeNB.
- The SeNB Change procedure is initiated by MeNB and used to transfer a UE context from a source SeNB to a target SeNB and to change the SCG configuration in UE from one SeNB to another.

Although the above procedures are defined, it's not clear when uplink and downlink transmission via SCG/Split bearer stops during the above procedures. Moreover, for some procedures, it seems difficult to decide the point in time when uplink transmission should be stopped because there is no indication by which the SeNB can decide to stop the uplink transmission. Note that if the SeNB stops the uplink transmission stops at the same time when stopping the downlink transmission, the MAC would discard the PDU which contains both of data of valid logical channel and invalid logical channel.

Figure 14:
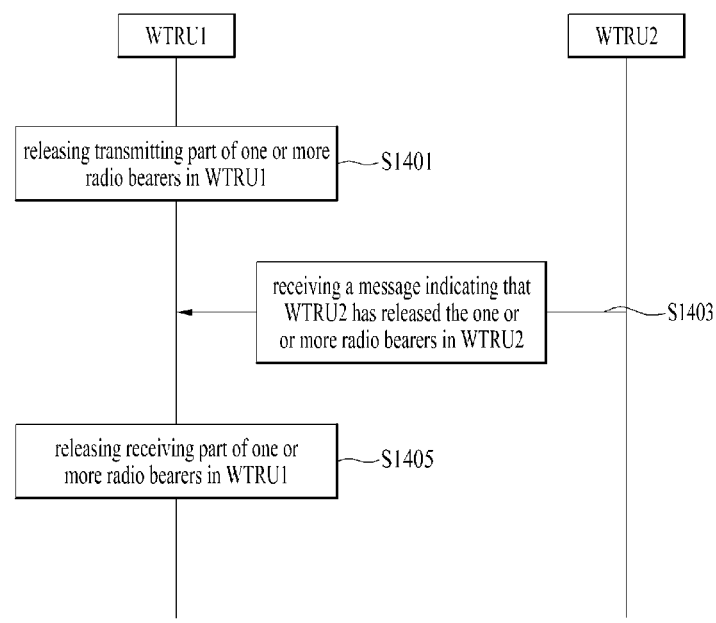
FIG. 14 is a conceptual diagram for handling of data transmission and reception for radio bearer release at a transmitting-receiving device according to embodiments of the present invention.

FIG. 14 is a conceptual diagram for handling of data transmission and reception for radio bearer release at a transmitting-receiving device according to embodiments of the present invention.

When there are two transmitting-receiving devices communicating each other, it is different time for releasing between a transmitting part of one or more radio bearer and a receiving part of one or more radio bearer in a transmitting-receiving device.

For example, firstly the first transmitting-receiving device releases "transmitting part" of one or more radio bearers in the first transmitting-receiving device (S1401). And then, when the a message indicating that a second transmitting-receiving device peering with the first transmitting-receiving device has released the one or more radio bearers in the second wireless transmitting-receiving device is received (S1403), the first transmitting-receiving device releases "receiving part" of the one or more radio bearers in the first transmitting-receiving device (S1405).

Figure 15:
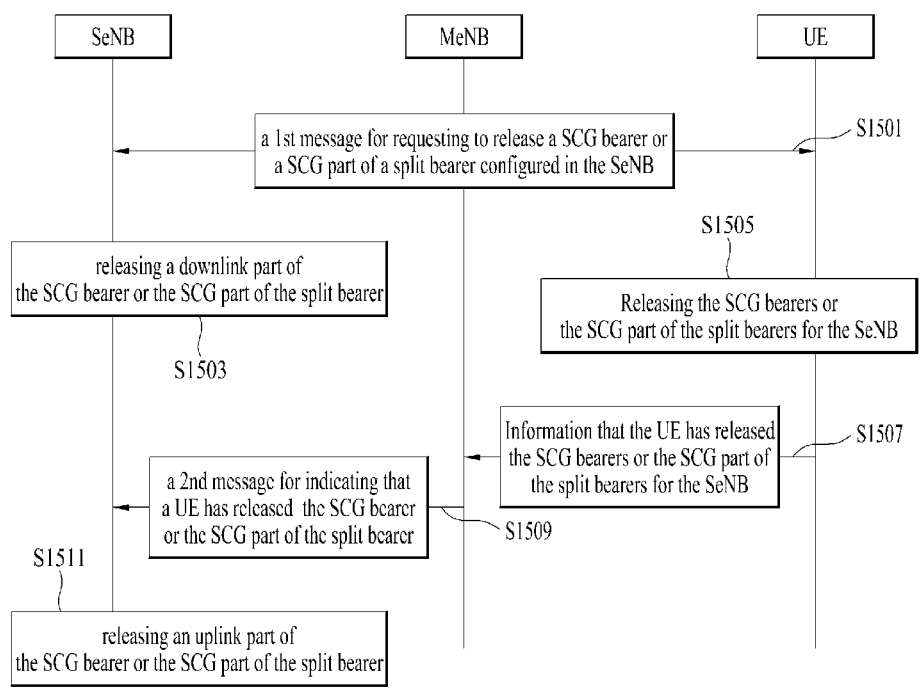
FIGS. 15 and 16 are conceptual diagrams for handling of data transmission and reception for SeNB related bearer release in a dual connectivity system according to embodiments of the present invention.

FIG. 15 is a conceptual diagram for handling of data transmission and reception for SeNB related bearer release in a dual connectivity system according to embodiments of the present invention.

FIG. 15 indicates that the SeNB modification/release/change procedure initiated by the MeNB to initiate release of SCG SCells (other than PSCell), SCG bearer and SCG part of Split bearer.

The MeNB transmits a $1^{st}$ message for requesting to release a SCG (Secondary Cell Group) bearer or a SCG part of a split bearer configured in the SeNB to the SeNB and the UE (S1501).

The SeNB also releases downlink part of the SCG bearer or the SCG part of the split bearer configured in the SeNB (S1503) and the UE releases the SCG bearers or the SCG part of the split bearers including both downlink part and uplink part for the SeNB (S1505).

In this case, the SeNB only releases the downlink part of the SCG bearer or the SCG part of the split bearer configured in the SeNB, when the 1st message is received.

After the UE releases the SCG bearers or the SCG part of the split bearers for the SeNB, the UE transmits information that the UE has released the SCG bearers or the SCG part of the split bearers for the SeNB to the MeNB (S1507).

The MeNB transmits a 2nd message for indicating that a UE has released the SCG bearer or the SCG part of the split bearer configured in the SeNB to the SeNB (S1509).

When the 2nd message is received, the SeNB releases uplink part of the SCG bearer or the SCG part of the split bearer configured in the SeNB (S1511).

Preferably, releasing the downlink part of the SCG bearer or the SCG part of a Split bearer (S1503), includes: i) SeNB stops downlink transmission; ii) SeNB stops downlink assignment; iii) SeNB discards the RLC PDUs or MAC PDUs to be transmitted for the SCG bearer or the SCG part of the Split bearer of which downlink part is released; or iv) SeNB releases the transmitting side of L2 entity, e.g., RLC entity.

Preferably, releasing the uplink part of the SCG bearer or the SCG part of a Split bearer (S1511) includes: i) stopping, by the SeNB, an uplink reception via the SCG bearer or the SCG part of the split bearer of which uplink part is released; ii) stopping, by the SeNB, an allocating uplink grant via the SCG bearer or the SCG part of the split bearer of which uplink part is released; iii) discarding the RLC (Radio Link Control) PDUs (Protocol Data Units) or MAC (Medium Access Control) PDUs received for the SCG bearer or the SCG part of the split bearer of which uplink part is released; or iv) releasing, by the SeNB, the receiving side of at least one of MAC entity, RLC entity and PDCP (Packet Data Convergence Protocol) entity via the SCG bearer or the SCG part of the split bearer of which uplink part is released.

Preferably, the $1^{st}$ message and the $2^{nd}$ message include an identifier of the SCG bearer or an identifier of the split bearer.

If the $1^{st}$ message includes the identifier of the SCG bearer or the identifier of the split bearer, the SeNB releases downlink part of the indicated SCG bearer or the SCG part of the split bearer configured in the SeNB. Otherwise, if the $1^{st}$ message doesn't include the identifier of the SCG bearer or the identifier of the split bearer, the SeNB releases downlink part of all SCG bearers or the SCG part of the split bearers configured in the SeNB.

If the $2^{nd}$ message includes the identifier of the SCG bearer or the identifier of the split bearer, the SeNB releases uplink part of the indicated SCG bearer or the SCG part of the split bearer configured in the SeNB. Otherwise, if the $2^{nd}$ message doesn't include the identifier of the SCG bearer or the identifier of the split bearer, the SeNB releases uplink part of all SCG bearers or the SCG part of the split bearers configured in the SeNB.

In case of an example for MeNB initiated SeNB Modification procedure, the MeNB requests to release a SCG bearer or a SCG part of a Split bearer by sending an SeNB Modification Request message to the SeNB including the identifier (RB ID) of the SCG bearer or the Split bearer (S1501). Upon receiving the SeNB Modification Request message from the MeNB, the SeNB releases the downlink part of the SCG bearer or the SCG part of the Split bearer indicated by the identifier (RB ID) (S1503).

The UE releases the downlink and uplink part of the SCG bearer or the SCG part of the split bearer indicated by the identifier (RB ID) upon receiving RRCConnectionReconfiguration message from the MeNB (S1505).

The SeNB releases the uplink part of the SCG bearer or the SCG part of the Split bearer (S1511) upon receiving SeNB Reconfiguration Complete message from the MeNB (S1509).

In case of an example for MeNB initiated SeNB Release procedure, the MeNB requests to release whole SCG bearer or SCG part of a Split bearer by sending a SeNB Release Request message to the SeNB (S1501). Upon receiving the SeNB Release Request message from the MeNB, the SeNB releases the downlink part of whole SCG bearer or SCG part of the Split bearer (S1503).

The UE releases the downlink and uplink part of whole SCG bearer or the SCG part of the Split bearer served by the SeNB upon receiving RRCConnectionReconfiguration message from the MeNB (S1505). After releasing the downlink and uplink part of whole SCG bearer or the SCG part of the Split bearer served by the SeNB, the UE transmits a message to the MeNB indicating that the UE has released whole SCG bearer or SCG part of the Split bearer (S1507).

If the MeNB receives the message from the UE indicating that the UE has released whole SCG bearer or SCG part of the Split bearer (S1507), the MeNB transmits a message to the SeNB indicating that the UE has released whole SCG bearer or SCG part of the Split bearer configured in the SeNB (S1509).

The SeNB releases the uplink part of whole SCG bearer or SCG part of the Split bearer upon receiving the message from the MeNB indicating that the UE has released whole SCG bearer or SCG part of the Split bearer configured in the SeNB (S1511).

Figure 16:
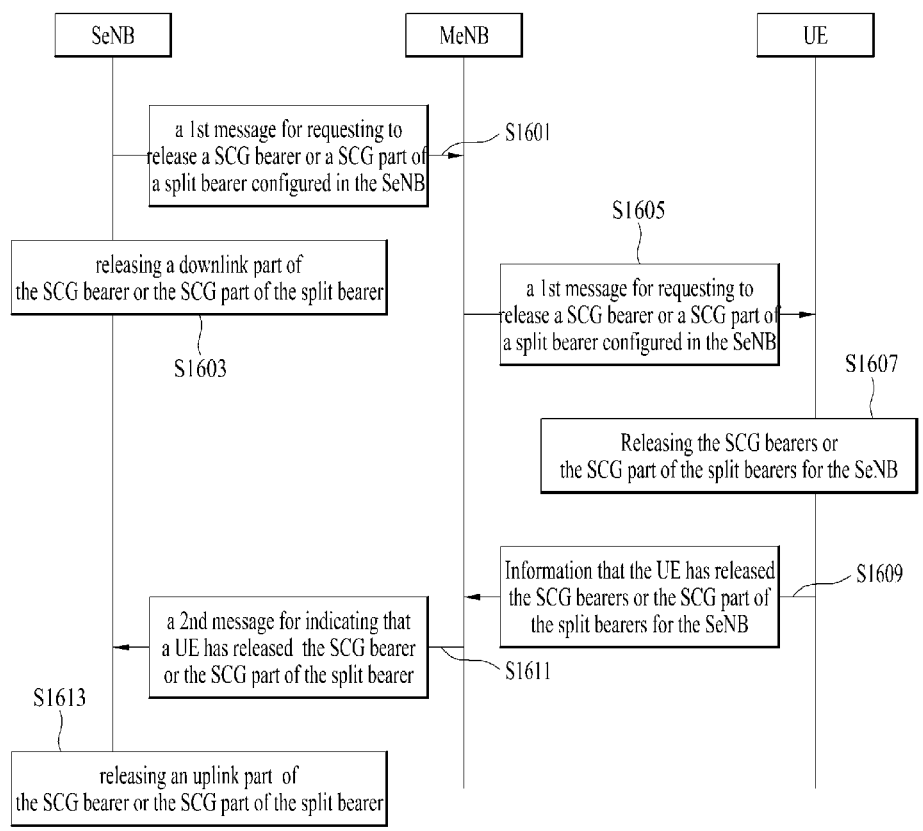

FIG. 16 is a conceptual diagram for handling of data transmission and reception for SeNB related bearer release in a dual connectivity system according to embodiments of the present invention.

FIG. 16 indicates that the SeNB modification/release/change procedure initiated by the SeNB to initiate release of SCG SCells (other than PSCell), SCG bearer and SCG part of Split bearer.

The SeNB transmits a 1st message for indicating that the SeNB has released or will release a SCG (Secondary Cell Group) bearer or a SCG part of a split bearer configured in the SeNB to the MeNB (S1601). The SeNB also releases downlink part of the SCG bearer or the SCG part of the split bearer configured in the SeNB (S1603). In this case, the SeNB only releases the downlink part of the SCG bearer or the SCG part of the split bearer configured in the SeNB, when the 1st message is received.

And then the MeNB transmits a $1^{st}$ message for requesting to release a SCG (Secondary Cell Group) bearer or a SCG part of a split bearer configured in the SeNB to the SeNB and the UE (S1605). The UE releases the SCG bearers or the SCG part of the split bearers including both downlink part and uplink part for the SeNB (S1607).

After the UE releases the SCG bearers or the SCG part of the split bearers for the SeNB, the UE transmits information that the UE has released the SCG bearers or the SCG part of the split bearers for the SeNB to the MeNB (S1609).

The MeNB transmits a 2nd message for indicating that a UE has released the SCG bearer or the SCG part of the split bearer configured in the SeNB to the SeNB (S1611).

When the 2nd message is received, the SeNB releases uplink part of the SCG bearer or the SCG part of the split bearer configured in the SeNB (S1613).

Preferably, releasing the downlink part of the SCG bearer or the SCG part of a Split bearer (S1607), includes: i) SeNB stops downlink transmission via the SCG bearer or the SCG part of the split bearer of which downlink part is released; ii) SeNB stops downlink assignment via the SCG bearer or the SCG part of the split bearer of which downlink part is released; iii) SeNB discards the RLC PDUs or MAC PDUs to be transmitted for the SCG bearer or the SCG part of the Split bearer of which downlink part is released; or iv) SeNB releases the transmitting side of L2 entity via the SCG bearer or the SCG part of the split bearer of which downlink part is released, e.g., RLC entity.

Preferably, releasing the uplink part of the SCG bearer or the SCG part of a Split bearer (S1613) includes: i) stopping, by the SeNB, an uplink reception for the SCG bearer or the SCG part of the split bearer of which uplink part is released; ii) stopping, by the SeNB, an allocating uplink grant for the SCG bearer or the SCG part of the split bearer of which uplink part is released; iii) discarding the RLC (Radio Link Control) PDUs (Protocol Data Units) or MAC (Medium Access Control) PDUs received for the SCG bearer or the SCG part of the split bearer of which uplink part is released; or iv) releasing, by the SeNB, the receiving side of at least one of MAC entity, RLC entity and PDCP (Packet Data Convergence Protocol) entity for the SCG bearer or the SCG part of the split bearer of which uplink part is released.

Preferably, the $1^{st}$ message and the $2^{nd}$ message include an identifier of the SCG bearer or an identifier of the split bearer.

If the $1^{st}$ message includes the identifier of the SCG bearer or the identifier of the split bearer, the SeNB releases downlink part of the indicated SCG bearer or the SCG part of the split bearer configured in the SeNB. Otherwise, if the $1^{st}$ message doesn't include the identifier of the SCG bearer or the identifier of the split bearer, the SeNB releases downlink part of all SCG bearers or the SCG part of the split bearers configured in the SeNB.

If the $2^{nd}$ message includes the identifier of the SCG bearer or the identifier of the split bearer, the SeNB releases uplink part of the indicated SCG bearer or the SCG part of the split bearer configured in the SeNB. Otherwise, if the $2^{nd}$ message doesn't include the identifier of the SCG bearer or the identifier of the split bearer, the SeNB releases uplink part of all SCG bearers or the SCG part of the split bearers configured in the SeNB.

In case of an example for SeNB initiated SeNB Modification procedure, the SeNB indicates that the SeNB has released or will release a SCG bearer or a SCG part of a Split bearer by sending an SeNB Modification Required message to the MeNB including the identifier (RB ID) of the SCG bearer or the Split bearer (S1601). When the SeNB transmits the SeNB Modification Required message to the MeNB, the SeNB releases downlink part of the SCG bearer or the SCG part of the Split bearer indicated by the identifier (RB ID) (S1603).

Upon receiving the SeNB Modification Required message from the SeNB (S1603), the MeNB transmits a message to the UE to release SCG bearer or the SCG part of the Split bearer indicated by the identifier (RB ID) (S1605). The UE releases the downlink and uplink part of the SCG bearer or the SCG part of the Split bearer indicated by the identifier (RB ID) (S 1607) upon receiving RRCConnectionReconfiguration message from the MeNB (S1605). The SeNB releases the uplink part of the SCG bearer or the SCG part of the Split bearer (S1613) upon receiving SeNB Modification Confirm message from the MeNB (S1611).

In case of an example for SeNB initiated SeNB Release procedure, the SeNB indicates that the SeNB has released or will release a SCG bearer or a SCG part of a Split bearer by sending an SeNB Release Required message to the MeNB (S1601). When the SeNB transmits the SeNB Release Required message to the MeNB, the SeNB releases whole SCG bearer or SCG part of the Split bearer (S1603).

Upon receiving the SeNB Release Required message from the SeNB (S1603), the MeNB transmits a message to the UE to release whole SCG bearer or the SCG part of the Split bearer (S1605).

The UE releases the downlink and uplink part of whole SCG bearer or the SCG part of the Split bearer served by the SeNB upon receiving RRCConnectionReconfiguration message from the MeNB (S1607). After releasing the downlink and uplink part of whole SCG bearer or the SCG part of the Split bearer served by the SeNB, the UE transmits a message to the MeNB indicating that the UE has released whole SCG bearer or SCG part of the Split bearer (S1609).

If the MeNB receives the message from the UE indicating that the UE has released whole SCG bearer or SCG part of the Split bearer (S1609), the MeNB transmits a message to the SeNB indicating that the UE has released whole SCG bearer or SCG part of the Split bearer configured in the SeNB (S1611).

The SeNB releases the uplink part of whole SCG bearer or SCG part of the Split bearer upon receiving the message from the MeNB indicating that the UE has released whole SCG bearer or SCG part of the Split bearer configured in the SeNB (S1613).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a secondary eNB (SeNB) operating in a wireless communication system, the method comprising:

receiving or transmitting, from or to a Master eNB (MeNB), a first message indicating that the SeNB has released or will release a Secondary Cell Group (SCG) bearer or a SCG part of a split bearer configured in the SeNB;

if the first message includes an identifier of the SCG bearer or an identifier of the split bearer, releasing a downlink part of the indicated SCG bearer or the indicated SCG part of the split bearer configured in the SeNB when the first message is received or transmitted;

receiving, from the MeNB, a second message for indicating that a UE has released the SCG bearer or the SCG part of the split bearer configured in the SeNB; and if the second message includes the identifier of the SCG bearer or the identifier of the split bearer, releasing an uplink part of the indicated SCG bearer or the indicated SCG part of the split bearer configured in the SeNB, when the second message is received.

2. The method according to claim 1, wherein the releasing the downlink part of the SCG bearer or the SCG part of the split bearer configured in the SeNB includes at least one of:

stopping, by the SeNB, a downlink transmission via the SCG bearer or the SCG part of the split bearer of which downlink part is released;

stopping, by the SeNB, a downlink assignment for the SCG bearer or the SCG part of the split bearer of which downlink part is released;

discarding, by the SeNB, the Radio Link Control (RLC) Protocol Data Units (PDUs) or Medium Access Control (MAC) PDUs to be transmitted for the SCG bearer or the SCG part of the split bearer of which downlink part is released; or releasing, by the SeNB, a transmitting side of at least one of MAC entity, RLC entity and Packet Data Convergence Protocol (PDCP) entity of the SCG bearer or the SCG part of the split bearer of which downlink part is released.

3. The method according to claim 1, wherein the releasing the uplink part of the SCG bearer or the SCG part of the split bearer configured in the SeNB includes at least one of:

stopping, by the SeNB, an uplink reception via the SCG bearer or the SCG part of the split bearer of which uplink part is released;

stopping, by the SeNB, an allocating uplink grant for the SCG bearer or the SCG part of the split bearer of which uplink part is released;

discarding the Radio Link Control (RLC) Protocol Data Units (PDUs) or Medium Access Control (MAC) PDUs received for the SCG bearer or the SCG part of the split bearer of which uplink part is released; or releasing, by the SeNB, the receiving side of at least one of MAC entity, RLC entity and Packet Data Convergence Protocol (PDCP) entity of the SCG bearer or the SCG part of the split bearer of which uplink part is released.

4. The method according claim 1, if the first message doesn't include the identifier of the SCG bearer or the identifier of the split bearer, the SeNB releases a downlink part of all SCG bearers or the SCG part of the split bearers configured in the SeNB.

5. The method according claim 1, if the second message doesn't include the identifier of the SCG bearer or the identifier of the split bearer, the SeNB releases an uplink part of all SCG bearers or the SCG part of the split bearers configured in the SeNB.

6. A User Equipment (UE) for operating in a wireless communication system, the UE comprising:
a Radio Frequency (RF) module; and
a processor operably coupled with the RF module and configured to: receive or transmit, from or to a Master eNB (MeNB), a first message indicating that a SeNB has released or will release a Secondary Cell Group (SCG) bearer or a SCG part of a split bearer configured in the SeNB,
if the first message includes an identifier of the SCG bearer or an identifier of the split bearer, release a downlink part of the indicated SCG bearer or the indicated SCG part of the split bearer configured in the SeNB, when the first message is received or transmitted,
receive, from the MeNB, a second message for indicating that a UE has released the SCG bearer or the SCG part of the split bearer configured in the SeNB, and
if the second message includes the identifier of the SCG bearer or the identifier of the split bearer, release an uplink part of the indicated SCG bearer or the indicated SCG part of the split bearer configured in the SeNB, when the second message is received.

7. The UE according to claim 6, wherein releasing the downlink part of the SCG bearer or the SCG part of the split bearer configured in the SeNB includes at least one of:
stopping, by the SeNB, a downlink transmission via the SCG bearer or the SCG part of the split bearer of which downlink part is released;
stopping, by the SeNB, a downlink assignment for the SCG bearer or the SCG part of the split bearer of which downlink part is released;
discarding, by the SeNB, the Radio Link Control (RLC) Protocol Data Units (PDUs) or Medium Access Control (MAC) PDUs to be transmitted for the SCG bearer or the SCG part of the split bearer of which downlink part is released; or
releasing, by the SeNB, a transmitting side of at least one of MAC entity, RLC entity and Packet Data Convergence Protocol (PDCP) entity of the SCG bearer or the SCG part of the split bearer of which downlink part is released.

8. The UE according to claim 6, wherein releasing the uplink part of the SCG bearer or the SCG part of the split bearer configured in the SeNB includes at least one of:
stopping, by the SeNB, an uplink reception via the SCG bearer or the SCG part of the split bearer of which uplink part is released;
stopping, by the SeNB, an allocating uplink grant for the SCG bearer or the SCG part of the split bearer of which uplink part is released;
discarding the Radio Link Control (RLC) Protocol Data Units (PDUs) or Medium Access Control (MAC) PDUs received for the SCG bearer or the SCG part of the split bearer of which uplink part is released; or
releasing, by the SeNB, the receiving side of at least one of MAC entity, RLC entity and Packet Data Convergence Protocol (PDCP) entity of the SCG bearer or the SCG part of the split bearer of which uplink part is released.

9. The UE according to claim 6, if the first message doesn't include the identifier of the SCG bearer or the identifier of the split bearer, the SeNB releases a downlink part of all SCG bearers or the SCG part of the split bearers configured in the SeNB.

10. The UE according to claim 6, if the second message doesn't include the identifier of the SCG bearer or the identifier of the split bearer, the SeNB releases an uplink part of all SCG bearers or the SCG part of the split bearers configured in the SeNB.

* * * * *